United States Patent
Craig et al.

(10) Patent No.: US 7,125,207 B2
(45) Date of Patent: Oct. 24, 2006

(54) TOOL HOLDER WITH INTEGRAL COOLANT CHANNEL AND LOCKING SCREW THEREFOR

(75) Inventors: Karen A. Craig, Greensburg, PA (US); Thomas J. Long, II, Greensburg, PA (US); Filho Ruy Frota de Souza, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 42 days.

(21) Appl. No.: 10/912,927

(22) Filed: Aug. 6, 2004

(65) Prior Publication Data

US 2006/0029481 A1    Feb. 9, 2006

(51) Int. Cl.
*B23B 51/06* (2006.01)
*B23C 5/28* (2006.01)

(52) U.S. Cl. .......................... 409/136; 409/234; 279/8; 408/57; 408/233; 407/11

(58) Field of Classification Search ................ 409/136, 409/234, 230, 231, 232, 233; 278/8, 20; 408/57, 59, 233, 231, 713; 407/11, 40, 46, 407/48
See application file for complete search history.

(56) References Cited

U.S. PATENT DOCUMENTS

| | | | | |
|---|---|---|---|---|
| 4,012,061 A * | 3/1977 | Olson | ...................... | 285/123.3 |
| 4,204,787 A * | 5/1980 | McCray et al. | ............. | 409/234 |
| 4,813,831 A | 3/1989 | Reinauer | | |
| 4,861,203 A | 8/1989 | Bassett et al. | | |
| 5,163,790 A * | 11/1992 | Vig | ............................. | 408/57 |
| 5,316,323 A * | 5/1994 | Jovanovic | ..................... | 279/22 |
| 5,542,792 A * | 8/1996 | Krueger et al. | ............... | 407/35 |
| 5,816,753 A * | 10/1998 | Hall | ........................... | 408/224 |
| 6,164,169 A * | 12/2000 | Goff | ........................ | 81/177.85 |
| 6,575,672 B1 * | 6/2003 | Maier | .......................... | 408/59 |
| 6,648,565 B1 * | 11/2003 | Schweizer | .................. | 409/234 |
| 2003/0017014 A1* | 1/2003 | Morgulis et al. | ............. | 407/34 |
| 2003/0095841 A1 | 5/2003 | Kraemer | | |

* cited by examiner

*Primary Examiner*—Monica Carter
*Assistant Examiner*—Dana Ross
(74) *Attorney, Agent, or Firm*—Larry R. Meenan

(57) ABSTRACT

A cutting tool including a cutter body and a locking screw. The cutter body has one or more pockets for receiving one or more cutting inserts and at least one channel for delivering coolant from a milling machine to the cutting inserts.

14 Claims, 2 Drawing Sheets

TOOL HOLDER WITH INTEGRAL COOLANT CHANNEL AND LOCKING SCREW THEREFOR

FIELD OF THE INVENTION

The present invention relates to machine tools and, more particularly, to a removable locking screw for use with a cutting tool holder. Most particularly, the present invention relates to a locking screw having coolant flow and dampening characteristics.

BACKGROUND OF THE INVENTION

A conventional cutting tool holder holds a cutting insert. During a machining operation, the cutting insert becomes heated. The heat spreads quickly through the cutting insert. The cutting insert, which is generally formed of cemented carbide, reaches, in a very short time, a range of temperatures within which the resistance to plastic deformation of the cutting insert material decreases. When large cutting forces act on the cutting insert, this phenomenon entails a risk that the cutting insert will be subject to plastic deformation, in particular, in the proximity of the cutting edge, where insert breakage can result. In order to diminish the risk of plastic deformation, an efficient system for cooling the cutting insert is required, whereby the working temperature of the insert can be regulated within desired limits. Generally, the cutting insert and the surrounding so-called cutting zone, are cooled by a coolant, in fluid form, that is led from outside the tool holder to flow towards the area where the heat is generated. An example of such fluid flow is described in U.S. Pat. Nos. 6,045,300 and 6,299,388. Such a supply of coolant has been generally arranged from above and directed downwardly towards the cutting insert and the chips, which are broken against a chip breaking upper side of the cutting insert. This method of supply, however, results in only a very limited amount of the coolant having any practical affect on the cutting insert. That is, because of the presence of the chips, the cutting edge is only exposed to the coolant to a very limited degree.

Another means of supplying coolant in fluid form is to steer the medium in a direction between the chip breaking surface of the cutting insert and the chip itself, as described, for example, in U.S. Pat. No. 6,652,200. However, when the cooling liquid is applied at normal pressures, this procedure does not result in any significant improvement in cooling effect compared to the aforementioned methods because the cooling liquid does not reach that part of the cutting insert which is hottest and which is exposed to the greatest mechanical load. Thus, a clear risk exists of the cutting insert becoming plastic because of excessively high temperatures. The effect of the cooling can certainly be increased considerably by increasing the pressure of the cooling liquid to very high levels but the equipment required to raise the cooling liquid pressure to this level is very complicated and expensive. Working with extremely high fluid pressure is furthermore, in practice, is undesirable.

In order to overcome the problem indicated above it has been proposed that the cutting insert itself be cooled from within, with the prime aim of holding the temperature in the cutting insert at such a low level that the risk of plastic deformation is for all intents and purposes eliminated. Several different solutions to the problem of how to internally cool cutting inserts have been proposed. For example, U.S. Pat. No. 5,275,633 describes a cutting insert which comprises two identical, partial bodies which are sintered together in such a way as to form internal, open channels through which the coolant can flow. German Patent No. 3,004,166 describes a cutting insert with a transverse hole through which a coolant can pass from an underlying shim in the direction towards a separate cover plate on the upper side of the cutting insert in order to be finally directed towards the cutting edge of the insert. French Patent No. 2,244,590 describes a cutting insert with a transverse channel for the coolant which extends from the underside of the cutting insert to the upper side where it discharges in the immediate vicinity of the cutting insert's cutting edge. U.S. Pat. No. 5,439,327 describes a cutting insert having an open groove disposed in the clearance surface of the cutting insert for the transport of a coolant from a channel in the corresponding tool holder in the direction of the cutting insert edge. U.S. Pat. No. 5,237,894 describes a cutting insert with a transverse, open channel for cooling liquid which terminates in an opening on the upper side of the cutting insert.

Common to all the solutions to the problem indicated above, which are based on transverse or open channels or grooves for feeding the coolant, is that the channels weaken the cutting insert in the cutting edge area and there is a risk that the channels will be blocked by the hot material of the chip which sticks to the insert surface. Furthermore, the existence of the channels or grooves limits the possibilities to design the cutting insert with an optimal chip breaker geometry.

It should also be mentioned that U.S. Pat. No. 3,571,877 describes a cutting insert with an internal cavity in which a coolant can circulate. However, this cavity weakens the cutting insert to such a large degree that its use is not practical when exposed to typical cutting forces.

It is desirable in the machine tool art to be able to provide an improved cutting tool with an internal cavity in which a coolant can circulate without weakening the cutting tool. This would result in a longer life for the insert.

SUMMARY OF THE INVENTION

Generally speaking, the invention is directed to a cutting tool that meets the foregoing needs. The cutting tool comprises a cutter body and a locking screw for mounting the cutter body to the milling machine. The cutter body has one or more pockets therein for receiving cutting inserts. The cutter body has at least one channel therein for delivering coolant from the milling machine to the cutting inserts. The locking screw is dimensioned to provide clearance between the cutter body and the locking screw. The clearance defines at least one reservoir. The locking screw has a cap and a threaded shank with a shoulder therebetween. The locking screw further has at least one channel therein that is in fluid communication with the reservoir. The channel extends along the threaded shank and beyond the shoulder into a cap.

In another embodiment of the invention, the cutting tool comprises a cutter body having a counter bore and a pilot hole therein, with a necked down portion therebetween. A locking screw has a cap and a threaded shank with a shoulder therebetween. The shoulder is adapted to seat against a seating surface defined by the necked down portion of the cutter body. The seating surface is as close as possible to the pilot hole without affecting the structural integrity of the cutter body.

In yet another embodiment of the invention, the cutting tool comprises a locking screw having a cap, a threaded shank, and a shoulder between the cap and the threaded shank, the locking screw further comprises at least one annular seal in an axially spaced relation to a shoulder. The annular seal is engageable with the cutter body with sufficient compression to provide at least one seal between the cap and the cutter body while providing a dampening effect between the locking screw and the cutter body. The compression of the annular seal is dependent on the axially spaced relation between the seal and the shoulder.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
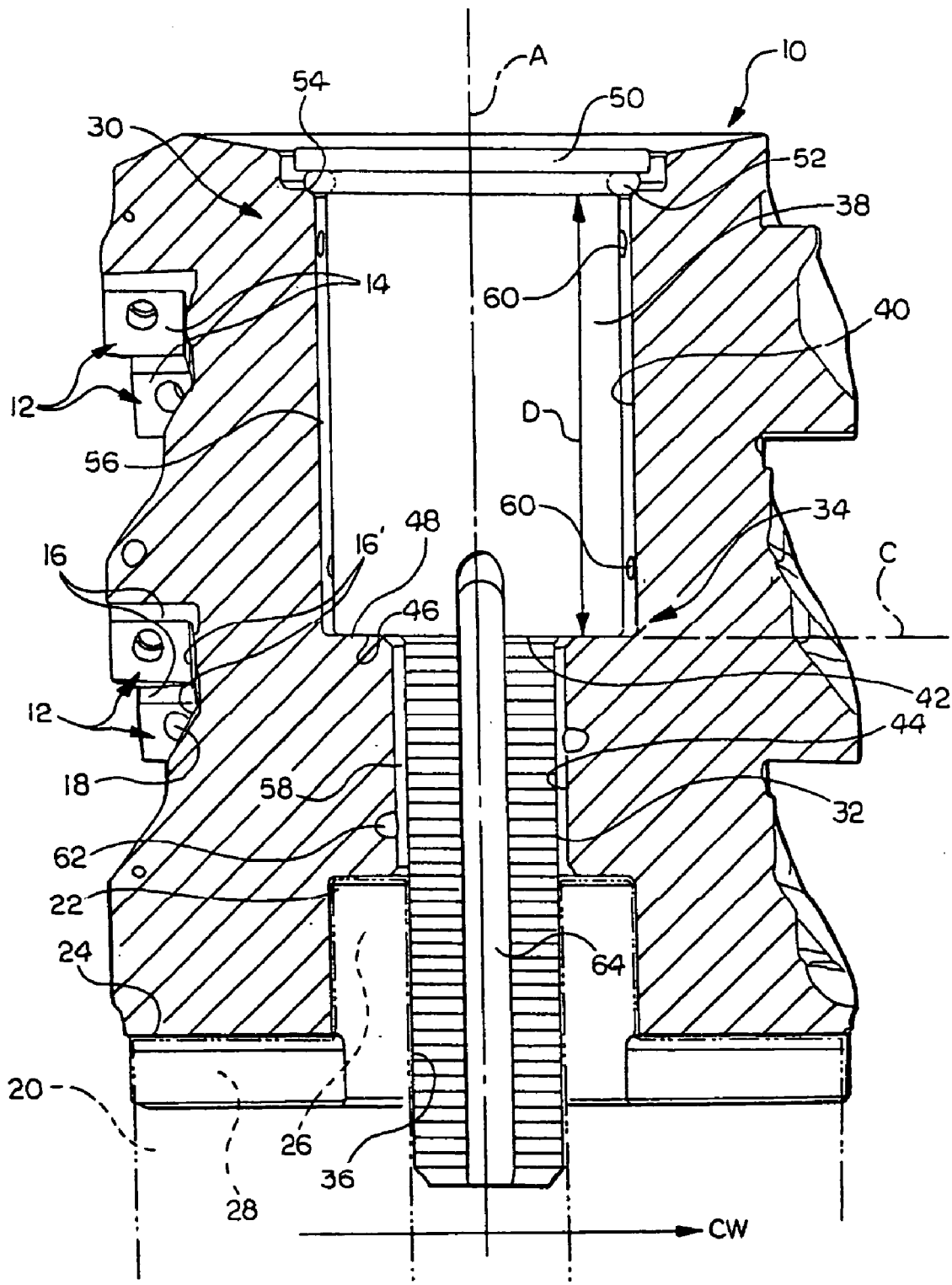
FIG. 1 is a partial sectional side elevational view of a cutter body secured to a tool holder adapter with a locking screw.

With reference now to the drawings, wherein like numerals designate like components throughout all of the several figures, there is illustrated in FIG. 1 a tool holder or cutter body, as generally indicated at 10. The cutter body 10 shown is particularly suited for helical shell milling operations. However, the cutter body 10 may take on other forms suitable for other metalworking operations.

The cutter body 10 comprises one or more pockets 12 formed therein. The pockets 12 in the illustrated cutter body 10 are arranged axially and circumferentially in an angularly spaced relation to each other. Each pocket 12 is provided for receiving a cutting insert (not shown). Each pocket 12 comprises a substantially planar seat or base 14 and two shoulders 16, 16'. The shoulders 16, 16' are substantially perpendicular to each other. Each shoulder 16, 16' provides a surface that abuts a corresponding surface of the cutting insert. A threaded bore 18 is provided in the vicinity of each pocket 12 for receiving a fastening screw (not shown) for securing the cutting insert within the pocket 12. The fastening screw forces the cutting insert towards the base 14 and shoulders 16, 16' of the pocket 12 via the head of the fastening screw. Consequently, the cutting insert is attached to the cutter body 10 in a detachable or removable manner.

The cutting insert may be any suitable polygonal shape, including but not limited to a generally triangular, rectangular, square, octagonal, hexagonal, or rhombic shape. A feature common to each of these shapes is that at least two sides or surfaces operatively join or intersect to form a corner or cutting edge. It should be appreciated that the cutting insert could have a plurality of cutting edges. For example, a triangular shaped cutting insert could have three cutting edges, a rectangular or square shaped cutting insert could have four cutting edges, etc.

In the embodiment shown, the cutter body 10 is adapted to be mounted to the spindle of a milling machine via a tool holder adapter 20. The cutter body 10 has a machine engaging end which has therein a pilot hole 22 and opposing keyways or drive slots 24. The tool holder adapter 20 has a pilot 26, which seats within the pilot hole 22, and opposing drive keys 28, which engage the drive slots 24. The illustrated cutter body 10 is rotated about a rotary axis A in a clockwise direction, indicated by the directional arrow CW shown in FIG. 1, to cut a workpiece (not shown). It should be appreciated that the tool holder adapter 20 shown is provided for illustrative purposes. The tool holder adapter 20 may be any suitable tool holder adapter.

The cutter body 10 is adapted to be mounted to the tool holder adapter 20 by a locking screw 30. The locking screw 30 has a threaded shank 32 that passes through a central axial bore 34 through the cutter body 10 and engages a tapped hole 36 in the pilot 26. The illustrated threaded shank 32 extends into the tool holder adapter 20 beyond the pilot 26. However, if the tool holder adapter 20 is not tapped beyond the pilot 26, a shorter threaded shank may be provided. The locking screw 30 further has a head or cap 38 that is received in a counter bore 40. The cap 38 has a shoulder 42 that engages a necked down portion, generally indicated at 44, of the central axial bore 34. In particular, the shoulder defines a seating surface 46 that seats against a seating surface 48 defined by one end of the necked down portion 44. The seating surface 48 is preferably about one-half the axial distance of the cutter body 10, or at about the axial center C of the cutter body 10. However, the seating surface 48 is most preferably as close to the pilot 26 as possible without affecting the structural integrity of the cutter body 10. In this way, the locking screw 30 is not cantilevered like a conventional locking screw. This places locking forces of the locking screw 30 closer to the pilot 26 so the locking screw 30 encounters less lever or bending effect and thus is stronger to maintain its position and therefor, is more stable.

The cap 38 has a flange 50 axially opposite the shoulder 42 or seating surface 46. At least one annular seal 52, such as an O-ring, is supported by the cap 38 adjacent the flange 50. The annular seal 52 may be a rubber like material, such as neoprene or silicon, or other material suitable for providing a seal. The axial distance D between the shoulder 42 or seating surface 46 and the annular seal 52 is sufficient to compress the annular seal 52 just enough to seal against a sealing surface 54 about the counter bore 40, or otherwise in the central axial bore 34 through the cutter body 10. It is preferred that the annular seal 52 is compressed by about 20 to 30 percent between the flange 50 and the sealing surface 54. However, the axial distance D could permit the annular seal 52 to be compressed in a range of about 10 to about 50 percent, and other ranges outside these limits may be also possible. The seating of the seating surfaces 46, 48 preferably prevents the locking screw 30 from being over tightened and the annular seal 52 from being over compressed. The proper compression of the annular seal 52 provides a dampening effect that reduces radial vibration and thus acts like a shock absorber between the cutter body 10 and the cap 38, and thus the locking screw 30. Although not shown, it should be appreciated that the cap 38 may be provided with a tool-engaging formation for tightening and loosening the locking screw 30. Although not shown in the drawings, it should also be appreciated that more than one seal may be used to create multiple coolant chambers within the cutter body 10.

It should be noted that the locking screw 30 and the central axial bore 34 are dimensioned to provide one or more cylindrical clearances between the locking screw 30 and the central axial bore 34. It is preferred that such clearance is provided between the circumferential periphery of the cap 38 and a corresponding portion of the central axial bore 34, and further between the threaded shank 32 and the necked down portion 44 of the central axial bore 34. One of these clearances forms or defines a reservoir 56 between the annular seal 52 and the seating surface 48 defined by the necked down portion 44 of the central axial bore 34. The other clearance forms or defines a reservoir 58 between the seating surface 46, defined by the shoulder 42 between the cap 38 and the threaded shank 32, and the pilot 26 that seats within the pilot hole 22 at the machine engaging end of the cutter body 10. The reservoirs 56, 58 are in fluid communication with one or more corresponding channels 60, 62 within the cutter body 10 that terminate or exit the cutter body 10 through openings (not shown) in the cutter body 10 at corresponding cutting inserts. The radial dimensions of the reservoirs 56, 58 are dependent upon the radial dimensions of the central axial bore 34 through the cutter body 10 and the necked down portion 44 of the central axial bore 34, or the radial dimensions of the seating surface 48. The reservoirs 56, 58 may be larger in diameter than conventional reservoirs and as a consequence, the channels 60, 62 within the cutter body 10 may be a shorter dimension or length.

Figure 2:
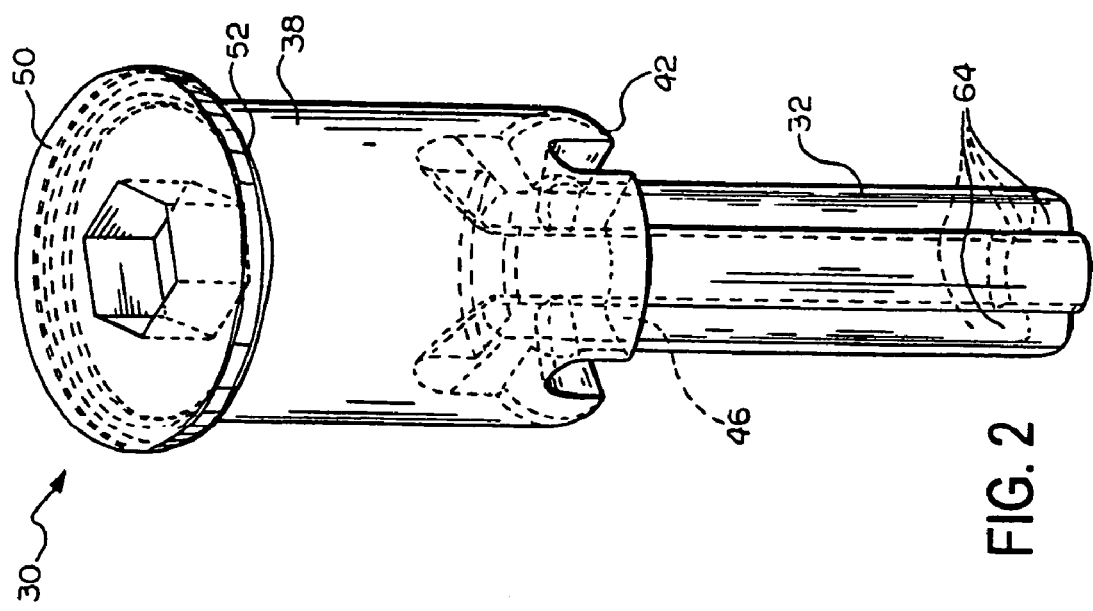
FIG. 2 is a perspective view of a locking screw, which is shown in FIG. 1.

The locking screw 30 is provided with one or more axially extending channels 64 that are in fluid communication with and thus carry or deliver coolant (not shown) to the reservoirs 56, 58 from the milling machine. In the locking screw 30 illustrated, four channels 64 are arranged circumferentially in an angularly spaced relation to each other, as is clearly shown in FIG. 2. The channels 64 are sized so that the sum of the area of the channels 64 meets the demand for coolant flowing through the channels 60, 62 within the cutter body 10 without affecting the structural integrity of the locking screw 30. It should be noted that the channels 64 extend up into the cap 38 beyond the shoulder 42 or seating surface 46 at the end of the cap 38 adjacent the threaded shank 32. This permits fluid communication with the reservoirs 56, 58 for a majority of the axial extent of the locking screw 30. This permits the reservoirs 56, 58 to be in closer proximity to each of the channels 60, 62 in the cutter body 10. Hence, the channels 60, 62 in the cutter body 10 can be shorter in length than channels in a conventional cutter body with a conventional locking screw. Although four channels 64 are shown, any suitable number of channels may be provided.

In operation, the cutter body 10 is rotated about the rotary axis A and the cutting edge is caused to cut the workpiece. As the cutter body 10 rotates, it also moves laterally or radially in a direction perpendicular to the rotary axis A to further cut the workpiece. As the workpiece is cut, chipping occurs, wherein chips are formed from material removed from the workpiece. Coolant passes through the channels 64 in the locking screw 30 into the reservoirs 56, 58 and into the channels 60, 62 within the cutter body 10 that exit at corresponding cutting inserts. The location of the seating surface 48 defined by the necked down portion 44 of the central axial bore 34 provides a stronger and stable locking screw 30 and the proper compression of the annular seal 52 produces a dampening effect between the locking screw 30 and the cutter body 10.

The channels 60, 62 within the cutter body 10 may exit at various places on or at the cutting inserts. In some instances, one channel may exit through a single coolant hole over two cutting inserts at once. In this instance, the coolant is washed from one cutting insert to the next and fewer channels are required to maintain coolant pressure. A smaller cutter body may have a channel for each cutting insert. A larger cutter body may have a channel for the cutting inserts closest to the workpiece (associated with the upper pockets 12 when viewing FIG. 1), while the cutting inserts (associated with the lower pockets 12 when viewing FIG. 1) further away from the workpiece may share channels. The channels 60, 62 provided depends on how much coolant is needed and the flow that can be achieved through the locking screw 30.

The size (i.e., diameter) of the locking screw 30 determines how many channels 64 can be in the locking screw 30 without sacrificing the strength of the locking screw 30. For example, a locking screw having a 0.375 inch (0.9525 cm) diameter may have three channels. A locking screw having a 0.75 inch (1.905 cm) diameter may have four channels. A locking screw having a 0.5 inch (1.27 cm) diameter may have three channels but the channels may be larger volume channels than the channels of a locking screw having a 0.375 inch diameter. The channels 64 in the locking screw 30 are sized to match the output of all the channels 60, 62 in the cutter body 10, while minimizing pressure loss. The channels 60, 62 in the cutter body 10 may have different diameters as well. For example, smaller diameter channels 60, 62 are preferred when many channels are needed. However, longer channels 60, 62 may require a larger diameter drill. In this case, fewer channels 60, 62 may be required if the channels 60, 62 are to maintain pressure and flow. A balance should be achieved between the strength of the locking screw 30, the size of the channels 64 in the locking screw 30, and the number of channels 60, 62 in the cutter body 10, along with the coolant pressure and flow needed to the cutting inserts.

Figure 3:
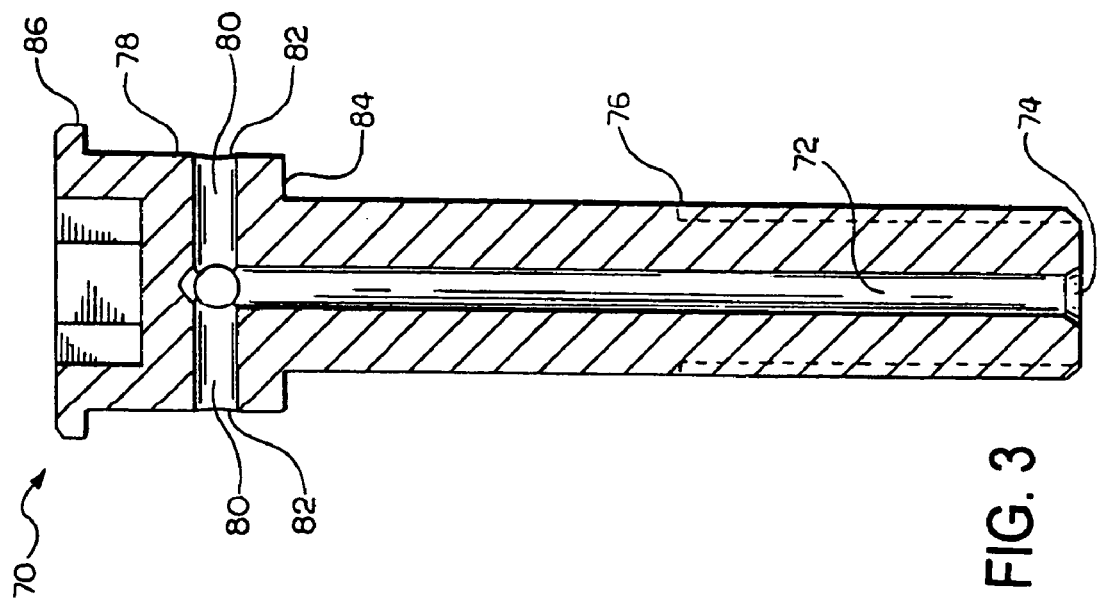
FIG. 3 is a sectional side elevational view of a locking screw according to an alternative embodiment of the invention.

An alternative locking screw 70 is illustrated in FIG. 3, wherein one or more axial channels 72 are located within the locking screw 70. The channel 72 illustrated originates at an opening 74 at the end of the threaded shank 76 of the locking screw 70 to communicate with a through-tool coolant machine and a through-tool coolant adapter (not shown). The channel 72 terminates in the cap 78 of the locking screw 70 in one or more transverse channels. In the illustrated locking screw 70, the channel 72 terminates in a cross-channel 80. The cross-channel 80 exits through openings 82 in the periphery of the cap 78. The openings 82 are preferably arranged circumferentially in an angularly spaced relation to each other. Similar to the aforementioned locking screw 30, the cap 78 of this locking screw 70 has a seating surface 84 that seats against a seating surface of a necked down portion of a central axial bore within a cutter body (not shown). Although not shown, an annular seal is supported by the cap 78 against a flange 86. Upon tightening the locking screw 70 within the central axial bore, the seating surface 84 seats against the seating surface within the cutter body and the annular seal seats against the cutter body, for example, about a counter bore in the cutter body. This forms a reservoir (not shown) which is in fluid communication with channels (not shown) in the cutter body. The operation of a cutter body with this locking screw 70 is similar to that of the cutter body 10 described above.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A cutting tool comprising:
   a cutter body including one or more pockets formed therein for receiving one or more cutting inserts, the cutter body being adapted to be mounted to a milling machine and having at least one channel therein for delivering coolant from the milling machine to the cutting inserts; and
   a locking screw for mounting the cutter body to the milling machine, the locking screw being dimensioned to provide clearance between the cutter body and the locking screw, the clearance defining at least one reservoir, the locking screw having a cap and a threaded shank with a shoulder between the cap and the threaded shank, the locking screw further having at least one peripheral channel therein that is in fluid communication with the reservoir, the channel extending along the threaded shank.

2. The cutting tool of claim 1, wherein the cutter body has a counter bore and a pilot hole with a necked down portion therebetween, the shoulder of the locking screw being adapted to seat against a seating surface defined by the necked down portion, the seating surface being as close as possible to the pilot hole without affecting the structural integrity of the cutter body.

3. The cutting tool of claim 1, wherein the cap supports at least one annular seal in an axially spaced relation to the shoulder, the annular seal being engageable with the cutter body with sufficient compression to provide a seal between the cap and the cutter body while providing a dampening effect between the cap and the cutter body, the compression of the annular seal being dependent on the axially spaced relation.

4. The cutting tool of claim 1, wherein the locking screw has one or more channels, including the at least one channel therein, the one or more channels in the locking screw being sized so that the sum of the area of the one or more channels meets the demand for coolant flowing through the channels within the cutter body without affecting the structural integrity of the locking screw.

5. The cutting tool of claim 1, wherein the at least one channel in the locking screw is an axial channel located within the locking screw.

6. The cutting tool of claim 1, wherein the channel extends beyond the shoulder into the cap.

7. A cutting tool comprising:
a cutter body including one or more pockets formed therein for receiving one or more cutting inserts, the cutter body being adapted to be mounted to a milling machine and having at least one channel therein for delivering coolant from the milling machine to the cutting inserts, wherein the cutter body has a counter bore and a pilot hole with a necked down portion therebetween, the pilot hole being adapted to receive a pilot that is adapted to seat against one end of the necked down portion, the shoulder of the cap being adapted to seat against another end of the necked down portion, the cap further having at least one annular seal in axial spaced relation to the shoulder and that seals against the cutter body, thus forming at least two reservoirs, one about the threaded shank between the pilot hole and the cap, and the other about the cap between the shoulder and the annular seal; and
a locking screw for mounting the cutter body to the milling machine, the locking screw being dimensioned to provide clearance between the cutter body and the locking screw, the clearance defining at least one reservoir, the locking screw having a cap and a threaded shank with a shoulder between the cap and the threaded shank, the locking screw further having at least one peripheral channel therein that is in fluid communication with the reservoir, the channel extending along the threaded shank.

8. A cutting tool comprising:
a cutter body including one or more pockets formed therein for receiving one or more cutting inserts, the cutter body being adapted to be mounted to a milling machine and having at least one channel therein for delivering coolant from the milling machine to the cutting inserts; and
a locking screw for mounting the cutter body to the milling machine, the locking screw being dimensioned to provide clearance between the cutter body and the locking screw, the clearance defining at least one reservoir, the locking screw having a cap and a threaded shank with a shoulder between the cap and the threaded shank, the locking screw further having at least one channel therein that is in fluid communication with the reservoir, the channel extending along the threaded shank and beyond the shoulder into the cap, wherein the at least one channel in the locking screw terminates in a cross-channel that exits through openings in the cap.

9. A cutting tool comprising:
a cutter body having a counter bore and a pilot hole therein, with a necked down portion between the counter bore and the pilot hole; and
a locking screw having a cap and a threaded shank with a shoulder between the cap and the threaded shank, the shoulder being adapted to seat against a seating surface defined by the necked down portion, the seating surface being as close as possible to the pilot hole without affecting the structural integrity of the cutter body, wherein the locking screw is dimensioned to provide clearance between the cutter body and the locking screw, the clearance defining at least one reservoir, the locking screw further having at least one channel therein that is in fluid communication with the reservoir, the channel extending along the threaded shank in an outer periphery thereof.

10. The cutting tool of claim 9, wherein the cap supports at least one annular seal in an axially spaced relation to the shoulder, the annular seal being engageable with the cutter body with sufficient compression to provide a seal between the cap and the cutter body while providing a dampening effect between the cap and the cutter body, the compression of the annular seal being dependent on the axially spaced relation.

11. The cutting tool of claim 9, wherein the channel extends beyond the shoulder into the cap.

12. A cutting tool comprising:
a cutter body; and
a locking screw comprising a cap and a threaded shank with a shoulder between the cap and the threaded shank, the cap supporting at least one annular seal in an axially spaced relation to the shoulder, the annular seal being engageable with the cutter body with sufficient compression to provide a seal between the cap and the cutter body while providing a dampening effect between the cap and the cutter body, the compression of the annular seal being dependent on the axially spaced relation, wherein the cutter body has a counter bore for receiving the cap of the locking screw and the cap has a radial flange, the seal being engageable with the cutter body about the counter bore and compressed by the radial flange.

13. The cutting tool of claim 12, wherein the annular seal is an O-ring.

14. The cutting tool of claim 12, wherein the annular seal is a rubber like material.

* * * * *